(12) United States Patent
Wang

(10) Patent No.: US 11,534,935 B2
(45) Date of Patent: Dec. 27, 2022

(54) PRINTING METHOD FOR WORKPIECE SUPPORT, SUPPORT STRUCTURE, AND WORKPIECE WITH SUPPORT

(71) Applicant: Suzhou Fusion Tech Co., Ltd., Suzhou (CN)

(72) Inventor: Jun Wang, Suzhou (CN)

(73) Assignee: Suzhou Fusion Tech Co., Ltd., Suzhou (CN)

( * ) Notice: Subject to any disclaimer, the term of this patent is extended or adjusted under 35 U.S.C. 154(b) by 79 days.

(21) Appl. No.: 17/133,590

(22) Filed: Dec. 23, 2020

(65) Prior Publication Data

US 2022/0126480 A1 Apr. 28, 2022

(30) Foreign Application Priority Data

Oct. 22, 2020 (CN) .......................... 202011142239.4

(51) Int. Cl.
| | |
|---|---|
| *B28B 1/00* | (2006.01) |
| *B33Y 10/00* | (2015.01) |
| *B33Y 50/02* | (2015.01) |
| *B29C 64/118* | (2017.01) |
| *B29C 64/393* | (2017.01) |
| *B22F 10/85* | (2021.01) |
| *B22F 10/18* | (2021.01) |
| *B33Y 80/00* | (2015.01) |
| *B28B 17/00* | (2006.01) |

(52) U.S. Cl.
CPC ............. *B28B 1/001* (2013.01); *B22F 10/18* (2021.01); *B22F 10/85* (2021.01); *B28B 17/0081* (2013.01); *B29C 64/118* (2017.08); *B29C 64/393* (2017.08); *B33Y 10/00* (2014.12); *B33Y 50/02* (2014.12); *B33Y 80/00* (2014.12)

(58) Field of Classification Search
CPC ......... B33Y 10/00; B33Y 50/02; B28B 1/001; B29C 64/118; B29C 64/393; B29C 64/40; B22F 10/40; B22F 10/43; B22F 10/47
See application file for complete search history.

(56) References Cited

U.S. PATENT DOCUMENTS 10,272,613 B2 * 4/2019 Boyd, IV ................ B29C 67/00

* cited by examiner

*Primary Examiner* — Michael P Wieczorek
(74) *Attorney, Agent, or Firm* — Avek IP, LLC

(57) ABSTRACT

3D printing methods for workpiece supports, support structures, and workpieces having supports are disclosed. In an embodiment, a printing method of a workpiece support includes the following steps. (1) Configuring a first printing scheme by a printing software installed in a printing apparatus and configuring a workpiece support model according to the first printing scheme. (2) Printing a workpiece support skeleton according to the first printing scheme and the workpiece support model by the printing apparatus and obtaining the workpiece support by filling the workpiece support skeleton. Optionally, step (2) includes controlling a second nozzle to eject a ceramic wire according to the first printing scheme and the support model and controlling a first nozzle to eject a linear material according to the support model to fill the workpiece support skeleton.

7 Claims, 3 Drawing Sheets

PRINTING METHOD FOR WORKPIECE SUPPORT, SUPPORT STRUCTURE, AND WORKPIECE WITH SUPPORT

CROSS REFERENCE TO RELATED APPLICATIONS

This application claims priority to Chinese application number 202011142239.4, filed on Oct. 22, 2020, the disclosure of which is incorporated by reference herein in its entirety.

FIELD OF THE DISCLOSURE

The disclosure relates generally to fused deposition modeling (FDM) printing methods. More specifically, the disclosure relates to FDM printing methods for workpiece supports, support structures, and workpieces having supports.

BACKGROUND

FDM (Fused Deposition Modeling) printing technology is widely used in the field of metal 3D printing. In this technology, a printing wire is formed by extrusion molding of metal powder mixed with polymer binder. After being heated to a molten state by a printing nozzle, the printing wire is deposited layer by layer to form a green part. Then, part of the polymer material is removed by an acid-catalyzed decomposition reaction to obtain a brown part. Finally, the brown part is sintered under high temperature to obtain a metal part.

During a metal 3D printing process, when a part has a dangling structure or a hollow structure, a support needs to be added to ensure the printing process to be completed smoothly since the forming step is a layer-by-layer deposition.

Currently, a support structure is printed using the same material as whole structure. Meanwhile, a ceramic material layer is added between the support structure and the main body for isolation. When adding a ceramic material layer for isolation, there will be a large bonding force between the ceramic material layer with both the workpiece itself and the support structure. It is therefore difficult to remove the support in this circumstance. Current methods of removing the support are mostly physical methods. However, when using a physical method, the support removal of a complex workpiece and a workpiece with a thin wall is difficult to handle and could easily cause damage to the workpiece in removing the support. In fact, inventors have found that, it is extremely difficult to remove the support of a complex workpiece and a workpiece with a thin wall structure by a physical method—the workpiece itself could be easily damaged and removing the support requires extremely high human effort and cost.

No effective solution has been proposed yet regarding the extreme difficulty and low efficiency in removing support using the discussed method.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides a printing method of a workpiece support including the following steps. (1) Configuring a first printing scheme by a printing software installed in a printing apparatus and configuring a workpiece support model according to the first printing scheme. (2) Printing a workpiece support skeleton according to the first printing scheme and the workpiece support model by the printing apparatus and obtaining the workpiece support by filling the workpiece support skeleton.

Optionally, the first printing scheme is selected from the group consisting of block printing, columnar printing, segment printing, special shape printing, and special angle printing.

Optionally, step (1) includes the following steps. Upon detecting there is a printing scheme configuration operation of a first user by the printing software, displaying a list of printing schemes on a display of the printing apparatus, determining the first printing scheme according to a selection of the first user in the displayed list of printing schemes, and configuring the workpiece support model according to the first printing scheme. Upon detecting there is no printing scheme configuration operation of the first user by the printing software, not performing any function.

Optionally, step (2) includes the following steps. Controlling a second nozzle of the printing apparatus to eject a ceramic wire according to the first printing scheme and the support model to obtain the workpiece support skeleton. Simultaneously controlling a first nozzle of the printing apparatus to eject a linear material according to the support model to fill the workpiece support skeleton.

Optionally, the printing method of the workpiece support further includes configuring a first filling scheme by the printing software.

Optionally, step (2) includes the following steps. Controlling a second nozzle of the printing apparatus to eject a ceramic wire according to the first printing scheme and the support model to obtain the workpiece support skeleton. Simultaneously controlling a first nozzle of the printing apparatus to eject a linear material according to the first filling scheme and the support model to fill the workpiece support skeleton.

Optionally, the first filling scheme is selected from the group consisting of linear filling, right-angle linear filling, honeycomb filling, concentric circle filling, spiral icositetrahedron filling, and triangular filling. The first filling scheme has a filling rate of 10-100%.

Optionally, the printing method of the workpiece support further includes after step (2) following steps: printing a workpiece body according to a second printing scheme and the workpiece support model to obtain a workpiece having a support; performing a debinding of the workpiece having the support in a catalytic debinding furnace; performing a sintering of the workpiece having the support in a sintering furnace; and removing the workpiece support by a physical method to obtain the workpiece body.

In other embodiments, the disclosure provides a support structure including a workpiece support printed by a method described in the application.

In further embodiments, the disclosure provides a workpiece having a support including a workpiece support printed by a method described in the application and a workpiece body disposed on the workpiece support.

BRIEF DESCRIPTION OF THE DRAWINGS

Illustrative embodiments of the present disclosure are described in detail below with reference to the attached drawing figures.

DETAILED DESCRIPTION

The following describes some non-limiting exemplary embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

It should be noted that the terms "first", "second" and so forth in the description and claims as well as the drawings of the present application are used to distinguish similar objects, and are not necessary to describe a particular order or sequential order. It should be understood that the data used this way may be interchanged where appropriate in order to facilitate the embodiments of the present application described herein. In addition, terms "comprising", "having", and any variations thereof are intended to cover non-exclusive inclusions, for example, processes, methods, systems, products or devices that contain a series of steps or units are not necessary to be limited to those explicitly listed steps or units, but may include other steps or units not explicitly listed or inherent to these processes, methods, products or devices.

In the present application, the orientation or positional relationship indicated by the terms "up", "down", "left", "right", "front", "back", "top", "bottom", "inside", "outside", "middle", "vertical", "horizontal", "transverse", "longitudinal" and the like are orientation or positional relationship shown based on the drawings. These terms are mainly used to describe the present application and the embodiments thereof better and are not used to define that the indicated apparatus, element, or component must have a specific orientation, or are configured and operated in a specific orientation.

Moreover, some of the terms mentioned above may be used to indicate other meanings, in addition to indicating orientation or positional relationship. For example, the term "up" may also be used to indicate a certain attachment relationship or connection relationship in some cases. For ordinary skilled in the art, the specific meanings of these terms in the application may be understood according to specific cases. In addition, the meaning of the term "a plurality of" shall be two or more. It should be noted that the embodiments of the present application and the features in the embodiments may be combined with each other without conflict.

Figure 1:
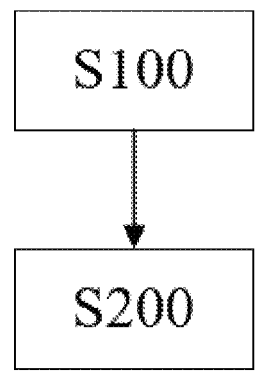
FIG. 1 is a schematic flow chart of a printing method of a workpiece support according to an embodiment of the disclosure.
Figure 2:
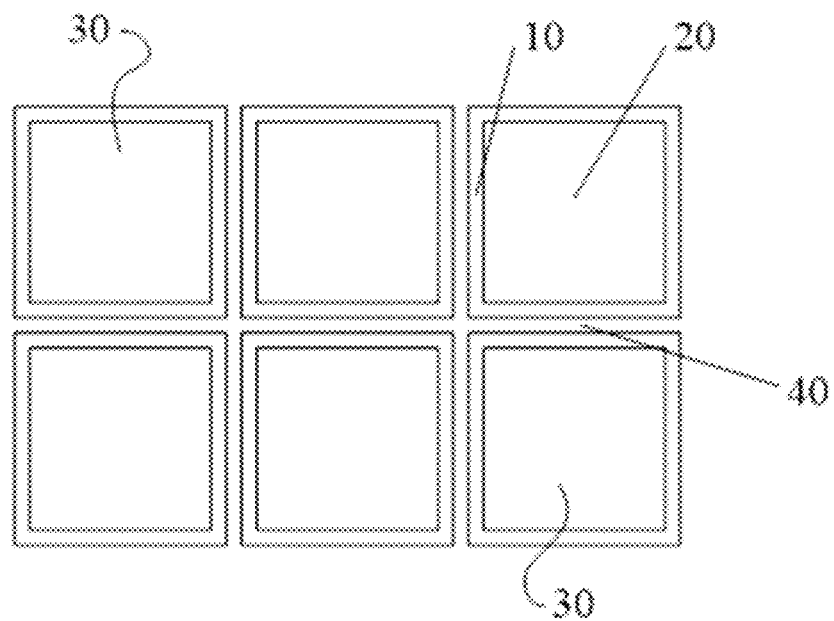
FIG. 2 is a partial schematic diagram of a workpiece support according to an embodiment of the disclosure.
Figure 3:
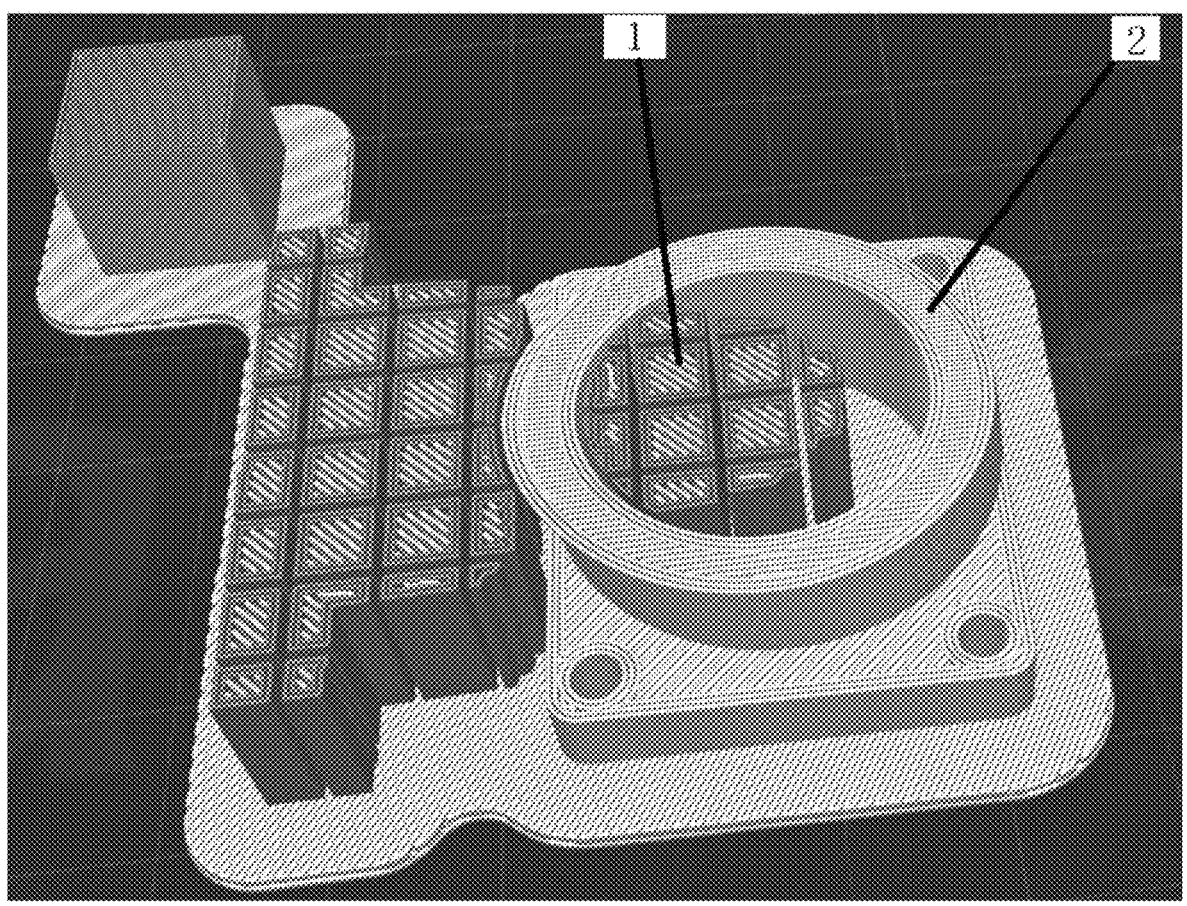
FIG. 3 is a schematic structural diagram of a workpiece having a support according to an embodiment of the disclosure.

FIGS. 1-3 illustrate some embodiments of the disclosure. In these figures, 1 represents a workpiece support, 2 represents a workpiece body, 10 represents a ceramic wire, 20 represents a linear material, 30 represents a support unit, and 40 represents a gap.

FIG. 1 shows a schematic flow chart of a printing method of a workpiece support 1 according to an embodiment of the disclosure. The printing method as shown may include following steps. Step S100: configuring a first printing scheme by a printing software installed in a printing apparatus and configuring a workpiece support 1 model according to the first printing scheme. Step S200: printing a workpiece support 1 skeleton according to the first printing scheme and the workpiece support 1 model by the printing apparatus and obtaining the workpiece support 1 by filling the workpiece support 1 skeleton.

The printing apparatus may be used to print and model the workpiece support 1 and the workpiece. Here, the printing apparatus may be a double nozzle 3D printer. The printing of different modules may be implemented by two or more nozzles. The processor may be configured to process data by the printing software installed therein. For human-computer interaction, a touch screen display electrically connected to the processor may be further provided. By a combination of the display and the printing software, a user may select and/or configure a corresponding printing scheme through a software interface generated on the display.

In the disclosure, the printing scheme may be one or more schemes preset in the printing apparatus, from which the user may select one scheme or a combination of schemes to perform printing of a workpiece support 1.

It should be understood that different structures of the workpiece support 1 may be printed by different printing schemes, and some special structures may make the combination of workpiece supports poor, so that the workpiece support 1 may be easily disassembled. Accordingly, as long as a printing scheme is set and the workpiece support 1 is printed according to the set printing scheme, the workpiece support 1 with a special structure may be printed, so that the printed workpiece support 1 may be easily disassembled.

In some embodiments, the first printing scheme may be selected from the group consisting of block printing, columnar printing, segment printing, special shape printing, and special angle printing. For example, FIG. 2 is a partial schematic diagram of a workpiece support 1 according to an embodiment of the disclosure, and FIG. 3 is a schematic structural diagram of a workpiece having a support according to an embodiment of the disclosure. Here, the block printing divides the workpiece support 1 into several support units 30 for printing, so that there is a gap 40 between two support units 30 to reduce the bonding force and to make the workpiece support 1 in a loose state. As a result, the workpiece support 1 may be easily and/or physically removed, and the workpiece body 2 would not be affected when removing the workpiece support 1.

It should be understood that when other printing schemes (columnar printing, segment printing, special shape printing, special angle printing, et cetera) are implemented, a corresponding step of setting a block support shape needs to be added in the operation steps in the beginning, and the block support shape may be preset and/or self-defined.

It should be understood that during segment printing, a corresponding step of setting the support height of each segment needs to be added in the operation steps, and at the same time, it is necessary to set the size of support interval of each segment.

It should be understood that the special angle printing means that the upward angle of the support may be self-defined, for example, printing of a 60-degree oblique upward circular support. The method may be implemented by importing the model of the support part and setting the printing parameters in the software by oneself. The support model may be obtained by software editing.

It should also be understood that different printing schemes correspond to different workpiece support 1 models; therefore, after the first printing scheme is configured, a corresponding workpiece support 1 model also needs to be configured to adapt to the first printing scheme.

In some embodiment, the workpiece support 1 model may be a three-dimensional model preset in the printing apparatus, and various parameters that affect the features (such as shape and size) of the workpiece support 1 may be configured in the model. Therefore, the printing apparatus may print different workpieces by different models.

After selecting and configuring the first printing scheme and the workpiece support 1 model, the printing apparatus may perform printing of workpiece support 1 according to the scheme and model. First, the workpiece support 1 skeleton may be printed according to the first printing scheme and the workpiece support 1 model, and then the workpiece support 1 skeleton may be filled. Since the special first printing scheme is used, the printed special workpiece support 1 skeleton structure may make the bonding force of the workpiece support 1 poor, so that the workpiece support 1 may be easily disassembled. Specifically, since the disassembly of the printed workpiece support 1 is easy, even for a thin-walled workpiece, the workpiece body 2 would not be damaged during the disassembly. As such, the operation may be simplified, and the disassembly efficiency may be improved since there is no need for a user to spend a lot of time to disassemble.

In other embodiments, after configuring the first printing scheme as block printing, a block support size (maximum area), a gap width (interval distance), a number of outer layers (wall thickness of a support unit), a filling method and other parameters may be firstly set according to suggestions of a software interface. Then, a slicing result meeting the set parameter requirements may be calculated by a slicing software. Finally, the slicing result is imported into the processor of the printing apparatus, and printing may be performed according to the slicing result to obtain the final workpiece with a support.

It should be understood that printing and filling may be performed at the same time, or one may be performed after another.

It should also be understood that the materials of printing and filling may be the same, both using the same metal material as the workpiece; or they may be different, that is, the material used for printing the skeleton may be an easily damaged material, and the material used for filling the skeleton may be the same metal material as the workpiece.

In further embodiments, configuring the first printing scheme by the printing software installed on the printing apparatus, and configuring the workpiece support 1 model according to the first printing scheme may include detecting whether there is a printing scheme configuration operation of a first user by the printing software. If yes, displaying a list of schemes on a display of the printing apparatus, determining the first printing scheme according to a selection of the first user in the displayed list of schemes, and configuring the workpiece support 1 model according to the first printing scheme. If no, performing no further action.

A software interface of the printing software may be displayed through the display of the printing apparatus. A first user may operate the software interface in touch or in keys. When the printing apparatus detects the scheme configuration operation of the first user, the list of schemes of the printing scheme may be retrieved from a memory, and the first user may select one scheme or a combination of schemes in the list of schemes as the first printing scheme. For example, when the selected first printing scheme is a block printing scheme, the printing apparatus may subsequently print the workpiece support 1 according to the selected block printing scheme.

After the first printing scheme is determined, the printing software may intelligently recommend one or more basic models according to the printing scheme and combine the determined first printing scheme and recommended basic models to form the workpiece support 1 model, or a user may configure one or more basic models by the display and combine them to form the workpiece support 1 model.

Optionally, the configuration operation may be an editing operation such as deleting, adding, or modifying parameters of the workpiece support 1 model.

In further embodiments, the printing apparatus printing the workpiece support 1 skeleton according to the first printing scheme and the workpiece support 1 model that are configured and obtaining the workpiece support 1 by filling the workpiece support 1 skeleton may include the following steps. Controlling a second nozzle of the printing apparatus to eject a ceramic wire 10 according to the first printing scheme and the support model to obtain the workpiece support 1 skeleton. Simultaneously controlling a first nozzle of the printing apparatus to eject a linear material 20 according to the support model to fill the workpiece support 1 skeleton.

Taking the first printing scheme as the block printing scheme as an example, the processor of the printing apparatus refers to the block printing scheme to control the second nozzle to eject the ceramic wire 10, and first print out a minimum support skeleton unit of the workpiece support 1 skeleton. At the same time, the processor refers to the support model to control the first nozzle of the printing apparatus to eject the linear material 20 and fill the minimum support skeleton unit with the linear material 20. According to the above method, a next minimum support skeleton unit may be printed and filled, until printing and filling of the workpiece support 1 is completed.

Compared with the currently used workpiece support, the workpiece support 1 in the disclosure may be divided into several workpiece support units (formed by filling linear materials in the minimum support skeleton unit) after being printed according to the block printing scheme. There may be a gap 40 between two support units 30, which may greatly reduce the bonding force of the workpiece support 1, so that the workpiece support 1 may be easily damaged. Accordingly, the workpiece support 1 may be easily disassembled. Specifically, since the disassembly of the printed workpiece support 1 is easy, even for a thin-walled workpiece, the workpiece body 2 would not be damaged during the disassembly. As such, the operation may be simplified, and the disassembly efficiency may be improved since there is no need for a user to spend a lot of time to disassemble.

Furthermore, such embodiments may also use a ceramic wire 10 in printing. Compared with the traditional use of the same metal material as the workpiece, a ceramic wire 10 may be easy to be damaged due to its physical and/or chemical characteristics, thereby facilitating the disassembly of the workpiece support 1. Combining this material with the above-mentioned printing scheme may easily complete the damage of the workpiece support 1, which may further help to improve the ease of operation and the efficiency of disassembly.

Optionally, considering the ease of disassembly, the ceramic wire 10 may be selected as the filling material, and other wires may also be selected as the filling material. If the support strength is sufficient, it may also be desirable that no material be filled in the skeleton.

Optionally, the ceramic wire 10 may be made by one or more of the following methods.

Preparing an alloy powder (reduction/atomization/carbonyl/electrolytic powder, iron/chromium/nickel/carbon/manganese/molybdenum/silicon and other powders have ratios according to the formula, D50 may be 1-100 microns), a polymer binder/dispersant/stabilizer/plasticizer/lubricant (polymer component is mainly POM polyoxymethylene, added with SA stearic acid/PW paraffin/PE polyethylene/PP polypropylene/ABS/EVA/PA polyamide/Maleic acid grafted), and other additives for the wire. The formula of the alloy powder may vary according to different printing wires, and for 316 L stainless-steel, the powder ratio may be 0-0.03% of carbon powder, 16-18% of chromium powder, 10-14% of nickel powder, 0-2% of manganese powder, 2-3% of molybdenum powder, 0-1% of silicon powder, and 62-72% of iron powder.

For an alumina wire required for printing, the requirement for alumina powder may be alumina powder >99.99% and the particle diameter D50 may be 1-100 microns. The formulation of the polymer binder may vary according to different debinding methods, wires, and feed manufacture methods. For one of the plastic-based wires, the composition range may be 60-90% of polyoxymethylene, 0-10% of polypropylene, 0-10% of paraffin wax, 0-5% of stearic acid, 0-5% of antioxidant, and 0-5% of other polymer additives. The ratio of alloy powder and polymer binder used in the raw material powder of the stainless-steel wire may be about 40-90% of alloy powder, and the proportion of polymer binder may be 10-60%. The ratio of alumina powder and polymer binder may be about 40-80% of alumina powder, and the proportion of polymer binder may be 20-60%.

Adding the raw material powders (metal powder or alumina powder+polymer substance) to a mixing and granulating integrated machine (or mixing machine+granulating machine) according to the aforementioned ratio(s) for mixing and granulating processing to produce a granular feed.

Adding the processed feed to an extruding machine (screw extruding machine/twin screw extruding machine/non-screw extruding machine, et cetera) to melt, extrude, stretch, and/or bend to produce a printed wire coil.

In some embodiments, before or after configuring the first printing scheme by the printing software installed in the processor of the printing apparatus and configuring the workpiece support 1 model according to the first printing scheme, the printing method of the workpiece support may further include configuring a first filling scheme by the printing software installed in the processor of the printing apparatus.

The configuration manner refers to the configuration manner of the first printing scheme, which may be a user performing configuration by the display of the printing apparatus. Here, the software interface of the printing software may be displayed through the display of the printing apparatus. The first user operates in the software interface in the form of touch or keys. When the printing apparatus detects the scheme configuration operation of the first user, the list of schemes of the filling scheme may be retrieved from a memory, and the first user may select one scheme or a combination of schemes in the list of schemes as the first filling scheme. For example, if the selected first filling scheme is a linear filling scheme, the printing apparatus may subsequently fill the workpiece support 1 skeleton according to the selected linear filling scheme.

It should be pointed out that after configuring the first printing scheme and the workpiece support 1 model, the configuration of the first filling scheme may be performed. The subsequent flow may be executed according to the printing software combined with configured scheme.

Figure 4:
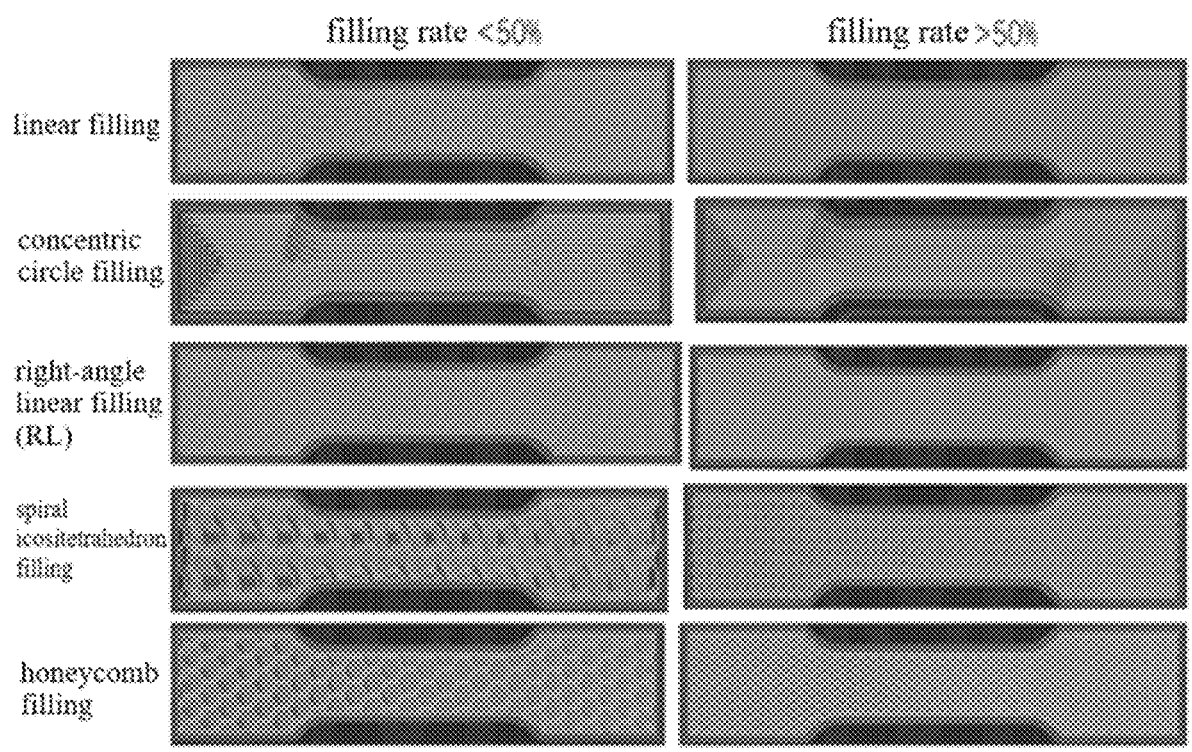
FIG. 4 is a schematic diagram of various filling schemes according to various embodiments of the disclosure.

FIG. 4 shows a schematic diagram of various filling schemes according to various embodiments of the disclosure. Optionally, the first filling scheme may be selected from the group consisting of linear filling, right-angle linear filling, honeycomb filling, concentric circle filling, spiral icositetrahedron filling, and triangular filling. The first filling scheme may have a filling rate of 10-100. Using one or more of the filling schemes as shown in FIG. 4 may help to improve the filling efficiency and may effectively adapt to different workpiece bodies.

It should be understood that the linear filling refers to filling the main body part of the workpiece or the filling part of the support by parallel lines. Here, the lines in the same direction may be printed for each layer, the starting points of the lines may be on the same side, and the lines may be printed up to the filling edge. Then, the print nozzle may move to the starting side to continue printing the next line. The direction of the line may change and become perpendicular to the previous layer for printing every other layer.

It should be understood that the right-angle linear filling may be similar to the linear filling, and both may be filling schemes using straight lines to fill the filling part of the workpiece. The distinction is that, in the right-angle linear filling, after printing one line, the print nozzle vertically prints for a short distance, and, at the same time, turns the printing direction to continue printing the next line, and continues until the current plane is filled up. When printing the next layer, the direction may be adjusted by 90 degrees, and the printing may be performed in the same way as the previous layer.

It should be understood that the spiral icositetrahedron filling means that each layer of wire may rotate an angle when filling. At the same time, the printing may be performed with a certain distance between each layer of wire. After printing, the filling may appear as a structure filled with an empty spiral icositetrahedron.

It should be understood that the honeycomb filling means that the single-layer filling shape may be a regular hexagonal grid and the printing manner of each layer may be the same.

It should be understood that the triangular filling refers to a filling manner in which the single-layer filling shape may be a regular triangular grid and the printing manner of each layer may be the same.

Optionally, printing the workpiece support 1 skeleton by the printing apparatus according to the first printing scheme and the workpiece support 1 model that are configured, and obtaining the workpiece support 1 by filling the workpiece support 1 skeleton, may include the following steps. Controlling a second nozzle of the printing apparatus to eject a ceramic wire 10 according to the first printing scheme and the support model to obtain the workpiece support 1 skeleton. Simultaneously controlling a first nozzle of the printing apparatus to eject a linear material 20 according to the first filling scheme and the support model to fill the workpiece support 1 skeleton.

In order to make the shrinkage rate of the workpiece support 1 and the shrinkage rate of the metal workpiece body 2 adapt to each other, it may be necessary to fill the workpiece support 1 skeleton with the same or similar linear material 20 as the workpiece body 2 material. The linear material 20 may be stainless-steel, special copper alloy, titanium alloy, and other materials. Optionally, the linear material may be a stainless-steel wire since the material of the stainless-steel wire may be similar to that of the workpiece body 2 to be printed, which may well adapt to the shrinkage characteristics of the workpiece support 1.

It should be understood that the preparation method of the stainless-steel wire may be similar to those of ceramic wire 10.

In other embodiments, optionally, after printing the workpiece support 1 skeleton by the printing apparatus according to the first printing scheme and the workpiece support 1 model that are configured, and obtaining the workpiece support 1 by filling the workpiece support 1 skeleton, the printing method may further include the following steps.

Printing a workpiece body 2 by the printing apparatus according to a second printing scheme and the workpiece support 1 model that are configured to obtain a workpiece having a support.

Performing a debinding processing in a catalytic debinding furnace.

Performing sintering in a sintering furnace.

Removing the workpiece support 1 by a physical method to obtain the workpiece body 2.

When printing the workpiece support 1, or after printing the workpiece support 1, the printing apparatus may print the workpiece body 2 to obtain the workpiece having a support according to the second printing scheme and the workpiece support 1 model that are configured. After printing, the workpiece having the support may be removed, and the debinding processing may be performed in the catalytic debinding furnace. After debinding, the workpiece may be taken out and sintered in the sintering furnace. After sintering, the workpiece may be taken out, and the support structure (workpiece support 1) of the workpiece may be removed by a physical method to obtain the final finished workpiece, that is, the workpiece body 2.

In further embodiments, it may be preferable to optimize the filling rate and printing parameters by printing workpieces with different parameters and testing the performance after sintering, and then print the workpiece support 1 and the workpiece by the optimized filling rate and printing parameters, so that printed workpiece support 1 and workpiece may be more in line with the standard.

The foregoing is merely preferred embodiments of the present application and is not intended to limit the present application, and various changes and modifications may be made on the present application by those skilled in the art. Any modification, equivalent substitution, improvement and the like within the spirit and principles of the present application should all fall within the scope of protection of the present application.

Various embodiments of the disclosure may have one or more of the following effects. In some embodiments, the disclosure provides printing methods of a workpiece support, a support structure, and a workpiece having a support, which may help to solve the problem of the extreme difficulty and low efficiency in removing support. In other embodiments, a manner of configuring a special printing scheme may be implemented, a first printing scheme may be configured by a printing software installed in a processor of a printing apparatus, and a workpiece support model may be configured according to the first printing scheme. The printing apparatus may print a workpiece support skeleton according to the first printing scheme and the workpiece support model that are configured, and a workpiece support may be obtained by filling the workpiece support skeleton. The objective of changing the structure of the workpiece support may be achieved, which may help to ensure that the workpiece support is easy to disassemble and the disassembly efficiency is sufficiently improved.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. A printing method of a workpiece support, comprising:
   (1) configuring a first printing scheme by a printing software installed in a printing apparatus, and configuring a workpiece support model according to the first printing scheme; and
   (2) printing a workpiece support skeleton according to the first printing scheme and the workpiece support model by the printing apparatus, and obtaining the workpiece support by filling the workpiece support skeleton;
   wherein the printing method further comprises, after step (2):
   printing a workpiece body according to a second printing scheme and the workpiece support model to obtain a workpiece having a support;
   performing a debinding of the workpiece having the support in a catalytic debinding furnace;
   performing a sintering of the workpiece having the support in a sintering furnace; and
   removing the workpiece support by a physical method to obtain the workpiece body.

2. The printing method of claim 1, wherein the first printing scheme is selected from the group consisting of block printing, columnar printing, segment printing, special shape printing, and special angle printing.

3. The printing method of claim 1, wherein step (1) comprises:
   upon detecting there is a printing scheme configuration operation of a first user by the printing software,
      displaying a list of printing schemes on a display of the printing apparatus,
      determining the first printing scheme according to a selection of the first user in the displayed list of printing schemes, and
      configuring the workpiece support model according to the first printing scheme; and
   upon detecting there is no printing scheme configuration operation of the first user by the printing software, not performing any function.

4. The printing method of claim 1, wherein step (2) comprises:
   controlling a second nozzle of the printing apparatus to eject a ceramic wire according to the first printing scheme and the support model to obtain the workpiece support skeleton; and
   simultaneously controlling a first nozzle of the printing apparatus to eject a linear material according to the support model to fill the workpiece support skeleton.

5. The printing method of claim 1, further comprising configuring a first filling scheme by the printing software.

6. The printing method of claim 5, wherein step (2) comprises:
- controlling a second nozzle of the printing apparatus to eject a ceramic wire according to the first printing scheme and the support model to obtain the workpiece support skeleton; and
- simultaneously controlling a first nozzle of the printing apparatus to eject a linear material according to the first filling scheme and the support model to fill the workpiece support skeleton.

7. The printing method of claim 5, wherein:
- the first filling scheme is selected from the group consisting of linear filling, right-angle linear filling, honeycomb filling, concentric circle filling, spiral icositetrahedron filling, and triangular filling; and
- the first filling scheme has a filling rate of 10-100%.

* * * * *